United States Patent Office 2,861,352
Patented Nov. 25, 1958

2,861,352

SILICONE RELEASE AGENT FOR DRYER FLIGHT COATINGS

Eldon E. Fender, Cincinnati, Ohio, assignor to Phillips Petroleum Company, a corporation of Delaware No Drawing. Application January 12, 1956
Serial No. 558,625

5 Claims. (Cl. 34—22)

This invention relates to a novel coating for dryer flights wherein rubber coagulum is dried. In one of its aspects, this invention relates to a silicone release agent as coating on dryer flights wherein oil is extended and/or non-pigmented rubber crumb is dried.

In recent years the use of synthetic rubber has replaced natural rubber in many applications. While these synthetic rubbers can be prepared by several polymerization methods, aqueous emulsion polymerization is by far the most important method commercially. However, when synthetic rubber is produced by coagulation from an aqueous latex, it is necessary that the copolymer be dried as is also true of natural rubber coagulated from natural latex. One method of drying the rubber is to convey the same to a dryer. In one type of dryer, the rubber is distributed evenly over a dryer flight. There are uually a plurality of dryer flights, each flight comprising a metal belt made in sections. Each of these sections have a plurality of long-narrow openings say about $\frac{1}{8}''$ wide and about $\frac{1}{2}''$ long, or small circular holes can be used. As these metal belts move, the rubber is carried to the end of each flight where it drops to the next flight and so on until the rubber is discharged from the dryer off of the last flight. Hot air, generally heated over steam coils, passes over and through the copolymer and the openings in the metal belt. While the rubber is being carried through the dryer on these flights, it is freed of substantially all of its moisture.

During the operation of the dryer, certain rubbers have a tendency to stick to the flights and eventually plug the holes in the belt to the extent that it is necessary to shut down the dryer and clean the flights. To avoid this sticking and plugging, in the past, various materials have been applied or coated on the flights. Among the materials used with some success are a polyethylene oxide aqueous emulsion sold under the trade name of Carbowax, certain mold release agents which are used in molding rubber to prevent the rubber from sticking to the process, certain waxes, and in some instances the flights have been coated with a polymerized tetrafluoro ethylene sold under the trade name of Teflon. These materials are applied by various methods and particularly by brushing or spraying. None of these materials have been entirely satisfactory. While Teflon coated flights are superior to the uncoated flights, they must be cleaned periodically and the coating material is damaged by the cleaning operation so that the coating life is approximately one year under ordinary service conditions. This material is comparatively expensive and so is not ordinarily used.

One method which has been widely used has been to let a bag full of talc drag on the dryer flight and deposit talc on the flights just before the rubber is added. When using this material it has been necessary to shut the dryer down about once every two weeks for a preliminary cleaning with steel brushes. These preliminary cleanings for a three flight dryer require about 6 to 10 men for about 8 hours each. About every month it is necessary to shut the dryer down for a thorough cleaning. This cleaning requires the same number of men for 20 to 30 hours. Also the rubber picks up talc or other coating material and where a low ash rubber is required, e. g. wire or cable coating, this material cannot be used.

An object of this invention is to provide an improved coating on drier flights for use in drying rubber.

Other objects, advantages and features of this invention will be apparent to those skilled in the art having been given this disclosure.

According to this invention, dryer flights are coated with a water dispersible silicone release agent prior to loading said flights with a wet rubber.

I have found that when a water dispersible silicone release agent is applied to dryer flights prior to loading said flights with a wet rubber to be dried, that the dryer cleaning period has been extended to between six weeks and two months between cleanings at which time the dryer is shut down for general inspection and repairs. The use of the silicone coating results in less polymer build up and less buffing time is required for the cleaning than was employed when talc or other prior art coatings are used.

While this coating material is used advantageously with any rubber, the oil extended rubbers and non-pigmented rubbers are especially bad about sticking and plugging the dryer flights. That is, those rubber coagulated with carbon black or other pigment dispersed in the latex (i. e., the well known latex masterbatching procedure) do not stick to the dryer flights as much as do the non-pigmented rubbers. Furthermore, I have found that the copolymers of a conjugated diene and a vinylpyridine tend to stick more than do those rubbers of conjugated dienes and other monomers. This invention is useful in drying natural rubber or any of the synthetic rubbers known in the art prepared by emulsion polymerization. Such rubbery materials are well known in the art and need no further discussion here, this invention being directed toward the treatment of dryer flights.

The treating agent useful in this invention are water dispersible silicone resins of the type:

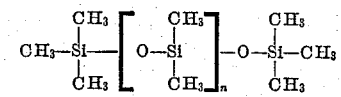

wherein $n$ is an integer resulting in a compound having a viscosity of at least 40 centistokes, and preferably at least 100 centistokes (cs.) at 25° C. and may be classed as polydimethyl siloxanes. These compounds are colorless, odorless, inert liquids which may vary in viscosity upwardly from 1 centistoke at 25° C. to about a million centistokes. The silicones found useful in this invention contain a small amount of a dispersing or wetting agent say of 0.1 to 5.0 weight percent based on the silicone, and have a viscosity in the range of 100 to 2000 centistokes at 25° C.

As has been indicated, the silicone is dispersed in water for use. Emulsions of these silicones in water are obtainable from the Dow Corning Corporation as silicone emulsions. However, the silicone can be dipersed in the water by use of any suitable wetting or dispersion agent such as salts of alkylaryl sulfonic acid, such as alkali metal, ammonium, ethanol-amine, quanidine, etc., as well as other dispersing agents. The silicone is put into a water dispersion of about 0.5 to 5 weight percent and applied to the flight prior to loading the flight with the copolymer to be dried. This application of the silicone can be made by any suitable method such as spraying, brushing and the like. I have found that one suitable means of applying the silicone is to soak a cloth waste with the solution and let the waste drag on the flight just ahead of the copolymer addition.

To illustrate the advantages of this invention the following examples are given. As has been stated, water dispersible emulsions of silicones are available commercially and it is generally more convenient to use these. For that reason, the silicone used in these examples is Dow Corning-8-emulsion referred to hereinafter as DC-8. This emulsion is a 35 percent emulsion in water of a silicone of the described formula having a viscosity of about 1000 cs. at 25° C. The dryers were operated at about 160° F.

EXAMPLE I

A series of runs was made to obtain a qualitative comparison of various coatings on dryer flight. The rubber being dried was a 80/10 copolymer of butadiene and 2-methyl-5-vinylpyridine (MVP) having a ML-4 Mooney value of about 20. The amount of polymer sticking using each coating was observed. The results are tabulated in Table I. 1 in the table indicates the greatest build up and 3 the least build up.

*Table I*

| Coating Material: | Observation |
|---|---|
| Castor oil | 1 |
| Carbowax | 1 |
| Antifoam-A [1] | 2 |
| DC-4 [2] | 2 |
| DC-7 [3] | 3 |
| DC-8 [3] | 3 |
| Dry talc | 2 |
| Talc in water slurry | 3 |
| Aquarex paste [4] | 2 |
| Glue | 1 |
| Glycerine | 1 |
| Sodium phosphate | 1 |
| Ethyl silicate | 1 |
| Teflon [5] | 3 |

[1] A silicone antifoam agent applied dispersed in oil.
[2] A silicone water repellent material applied dispersed in oil.
[3] A 35 percent water emulsion of a silicone of the type described applied in a 2½ percent solution of emulsion in water.
[4] Sodium salt of sulfonated higher fatty acid.
[5] Polymerized tetrafluoroethylene.

The silicone materials not dispersed in water were not as good as those so dispersed. While I am not bound by any theory, it is believed that these materials dispersed in oil when in the dryer, the low-boiling material evaporated leaving some heavier oils which helped to cause the material to stick. The Teflon gave very good results but this coating is expensive and is damaged when cleaned. The talc in water was very good, however, this material cannot be used when a low ash is required. The ratings of the various coatings is relative and there were variations within any classification, for example, the dry talc was very good but not quite good enough to be rated 3.

EXAMPLE II

To obtain a more quantitative test, an alum-coagulated butadiene/styrene non-pigmented copolymer of low Mooney and sticky consistency was dried in the dryer first using a talc slurry and then using a DC-8 (2½%) solution. After three days of operation using the talc slurry about ½ inch of polymer had built up on the flight and the dryer had to be shut down for cleaning. After cleaning, the dryer was again put into service using a 2½ percent aqueous dispersion of DC-8. The dryer operated one week without excessive build up.

EXAMPLE III

A third run was made using a copolymer of the same type as used in Example II, however, in this run ½ of the flight was coated with talc and ½ of the flight was coated with the 2½ percent slurry of DC-8 in water. Polymer stuck to the talc treated side while the DC-8 treated side was comparatively free of build up.

It should be noted that in these two examples, the DC-8 was superior to talc which compared favorably with the DC-8 of Example I when a different copolymer was being dried.

EXAMPLE IV

In a dryer wherein a carbon black-masterbatched 80/10 butadiene/MVP copolymer is being dried, when talc in a water slurry was used for coating the flight, the dryer was operated about two weeks when it had to be shut down for a preliminary cleaning and after one month of operation the dryer had to be shut down for a thorough cleaning. When this same dryer under the same conditions was operated with DC-8, 2½ percent water slurry, as the coating material, the dryer was operated six weeks before shutting down for repairs at which time the flights were cleaned.

It will be obvious to those skilled in the art that the water used for carrying the silicone is evaporated and that the silicone was the effective material and that any of the silicone materials, if dispersed in water, are operative in this invention. As has been indicated, this invention is illustrated by using a commercially aavilable water emulsion of silicone of the type described, however, it is within the scope of the invention to form such an emulsion by use of suitable dispersing agents. Other modifications will be obvious to those skilled in the art having been given this disclosure.

I claim:

1. In a process of drying a synthetic rubber coagulated from aqueous emulsion in a dryer by conveying said rubber through said dryer on dryer flights the improvement comprising applying continuously and directly to said flights prior to contacting same with said rubber an aqueous dispersion of a silicone of the type

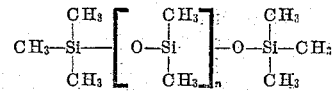

wherein $n$ is an integer resulting in a compound having a viscosity of at least 40 centistokes.

2. The improvement of claim 1 wherein the rubber being dried is an oil extended rubber.

3. The improvement of claim 1 wherein the rubber being dried is a non-pigmented rubber.

4. The improvement of claim 1 wherein the rubber being dried is a copolymer of a conjugated diene and a vinyl pyridine.

5. The improvement of claim 1 wherein said silicone dispersion is applied directly to said dryer flights by contacting said flights with a fibrous pad wet with said silicone dispersion.

References Cited in the file of this patent

UNITED STATES PATENTS 2,568,288  Montgomery _____ Sept. 18, 1951

FOREIGN PATENTS 2,488,446  Switzerland _____ Nov. 15, 1949

OTHER REFERENCES

Silicones, Dow Corning publication, 1947, page 7.